United States Patent [19]

Osborn

[11] 4,343,202
[45] Aug. 10, 1982

[54] PULL-TYPE LOCKOUT ACTUATOR FOR TRANSMISSION SHIFTERS

[75] Inventor: Charles Osborn, Spring Lake, Mich.

[73] Assignee: JSJ Corporation, Grand Haven, Mich.

[21] Appl. No.: 139,822

[22] Filed: Apr. 14, 1980

Related U.S. Application Data

[63] Continuation-in-part of Ser. No. 905,123, Aug. 12, 1978, Pat. No. 4,245,521, and Ser. No. 115,126, Jan. 24, 1980.

[51] Int. Cl.³ .................. F16H 57/06; G05G 9/16
[52] U.S. Cl. .................. 74/476; 16/121; 74/473 R; 74/538; 74/543
[58] Field of Search .......... 74/473 R, 476, 501 R, 74/538, 543; 16/121

[56] References Cited

U.S. PATENT DOCUMENTS

| | | | |
|---|---|---|---|
| 1,888,728 | 11/1932 | Johnson | 74/476 |
| 1,914,678 | 6/1933 | Starkey et al. | |
| 3,082,642 | 3/1963 | Hammerand | 74/543 |
| 3,167,336 | 1/1965 | Lewis | 74/543 X |
| 3,216,274 | 11/1965 | Hurst, Jr. et al. | 74/476 |
| 3,406,588 | 10/1968 | Hobbins | 74/476 |
| 3,527,115 | 9/1970 | Muhleck | 74/476 |
| 3,559,501 | 2/1971 | Wieland | 74/476 |
| 3,597,992 | 8/1971 | Lowry et al. | 74/476 |
| 3,603,077 | 9/1971 | Ganter | 16/121 X |
| 3,648,536 | 3/1972 | Maina | 74/476 |
| 3,774,469 | 11/1973 | Bruhn, Jr. | 74/476 |
| 3,779,096 | 12/1973 | Hurst et al. | 74/476 |
| 3,786,690 | 1/1974 | Bruhn, Jr. | 74/476 |
| 3,815,436 | 6/1974 | Morimoto et al. | 74/476 |
| 3,974,711 | 8/1976 | Hurst, Jr. | 74/473 R |
| 3,998,110 | 12/1976 | O'Brien et al. | 74/476 |
| 4,018,099 | 4/1977 | O'Brien et al. | 74/473 R |
| 4,143,560 | 3/1979 | Kinkade et al. | 74/473 R |

Primary Examiner—Allan D. Herrmann
Attorney, Agent, or Firm—Price, Heneveld, Huizenga & Cooper

[57] ABSTRACT

A pull-type actuator for an automotive transmission shifter is disclosed comprising a stationary base adapted to be mounted in an automotive vehicle. One or more gates are disposed in the base. A pivotable upstanding shift lever extends from the base and detent means is mounted for reciprocal movement in the base adjacent the lower end of the shift lever. The detent means must be aligned with a gate to allow entry into a locked out gear position. A manually actuable pull is disposed on the upper end of the shift lever and a flexible actuator link extends from the detent means to the pull. The actuator link is tensioned between the detent and the pull by a rack of teeth disposed on the upper end of the actuator link and a tooth engaging means disposed on the pull for engaging the teeth on the actuator link in a one way ratchet-like fashion.

17 Claims, 20 Drawing Figures

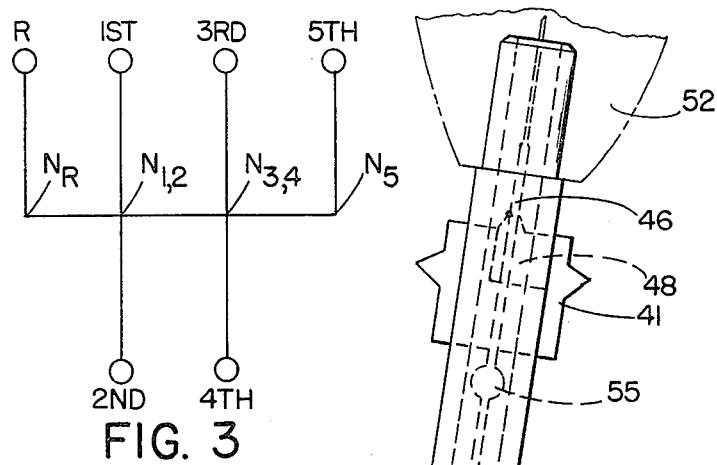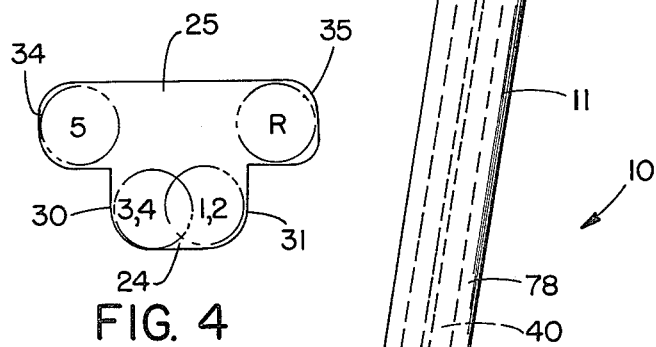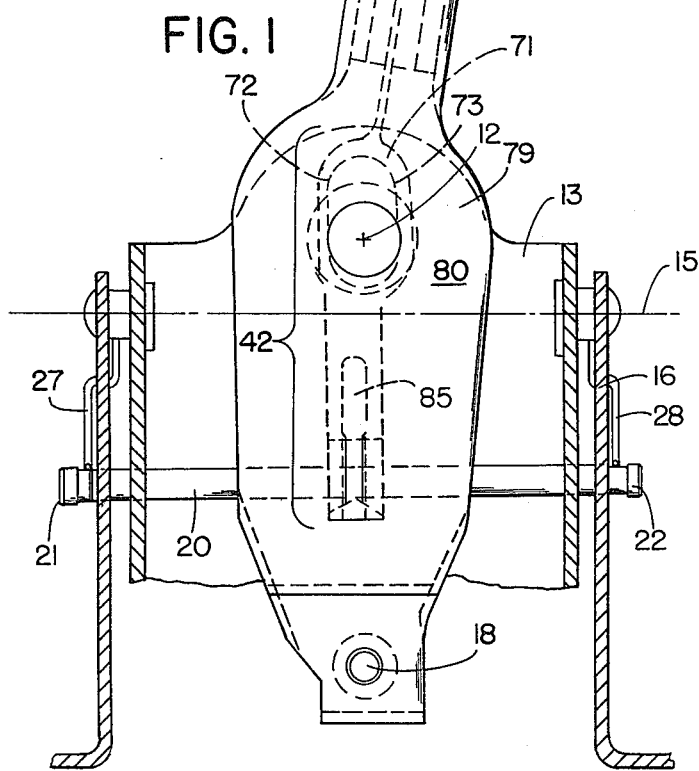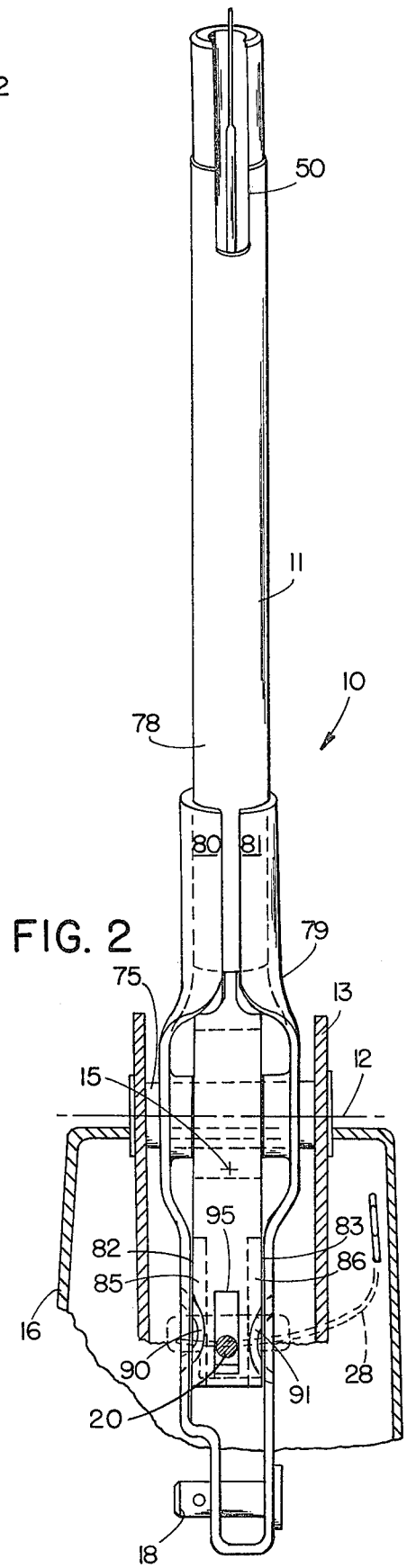
FIG. 3
FIG. 4
FIG. 1
FIG. 2

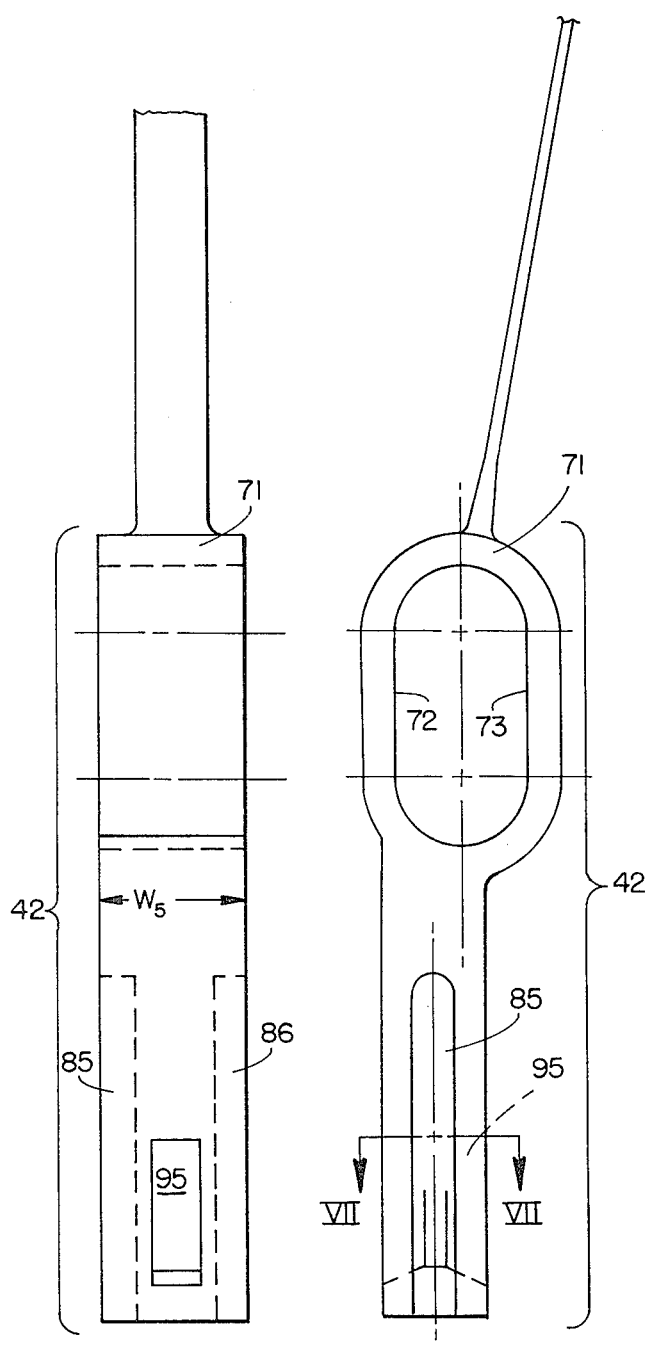
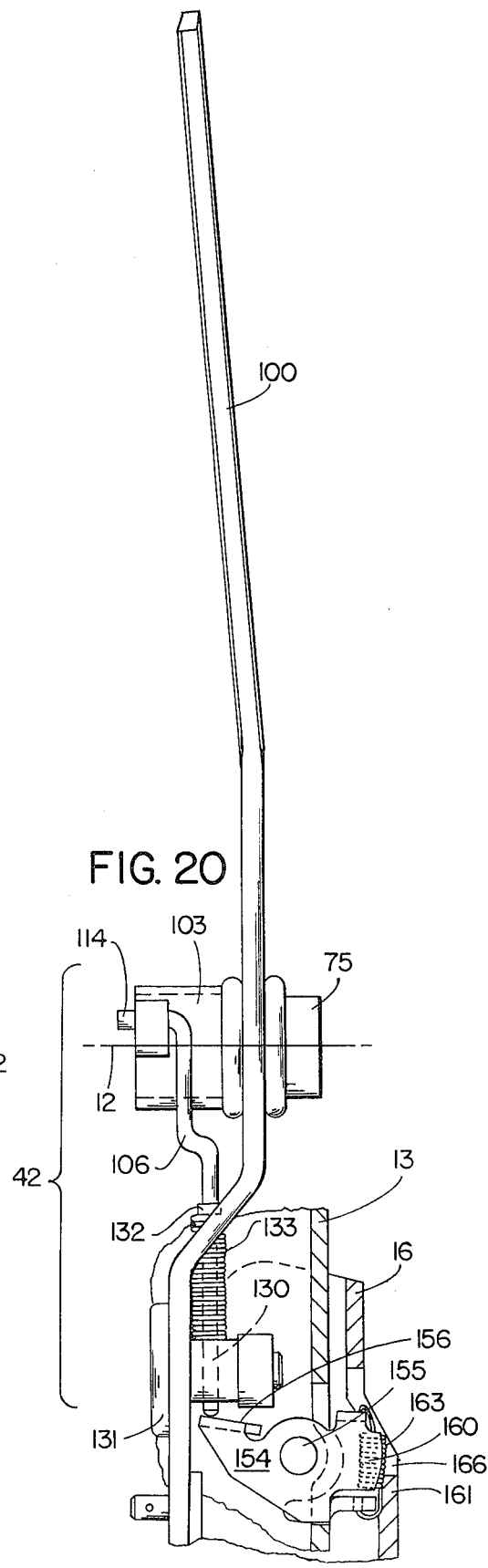
FIG. 5  FIG. 6  FIG. 20

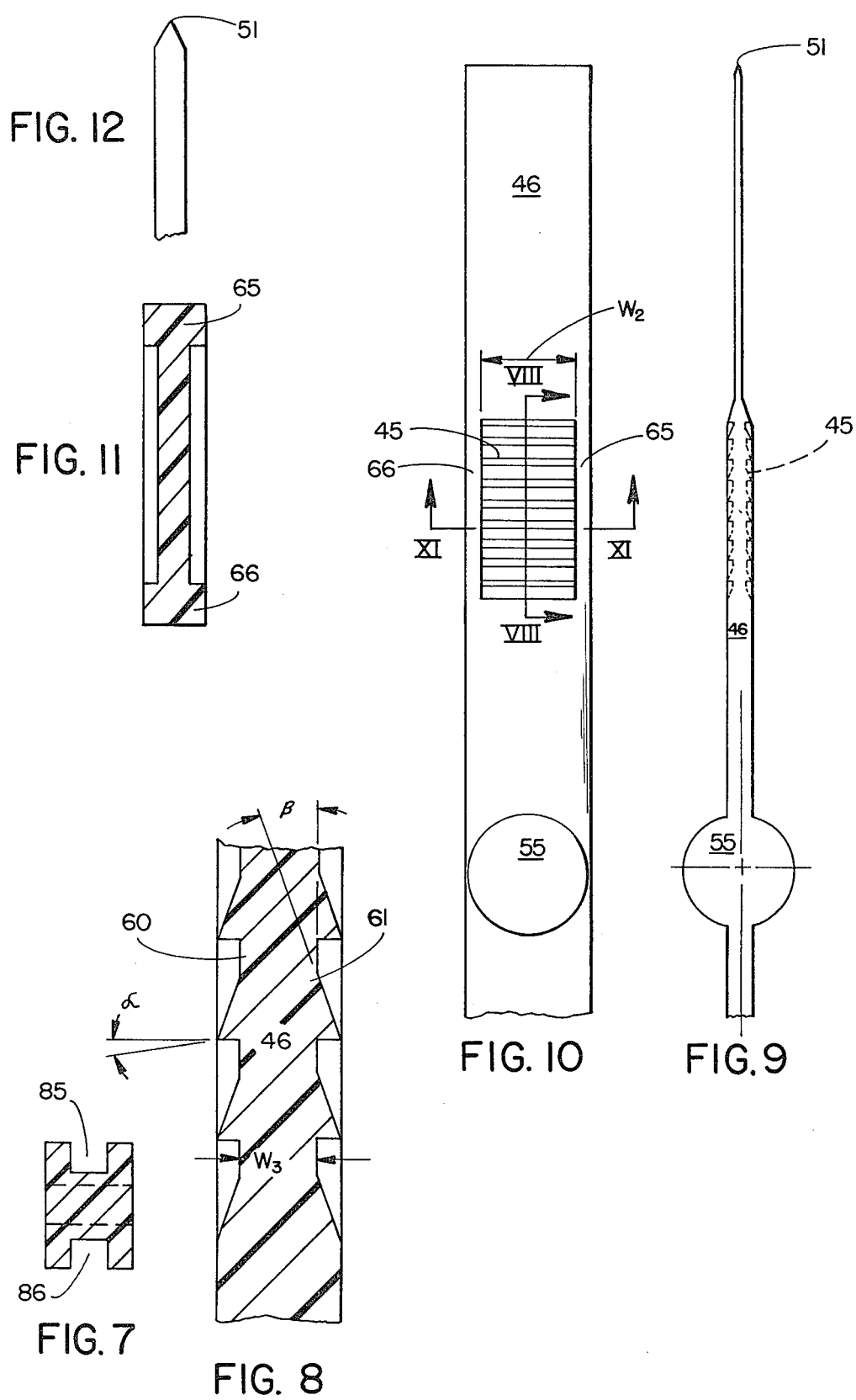

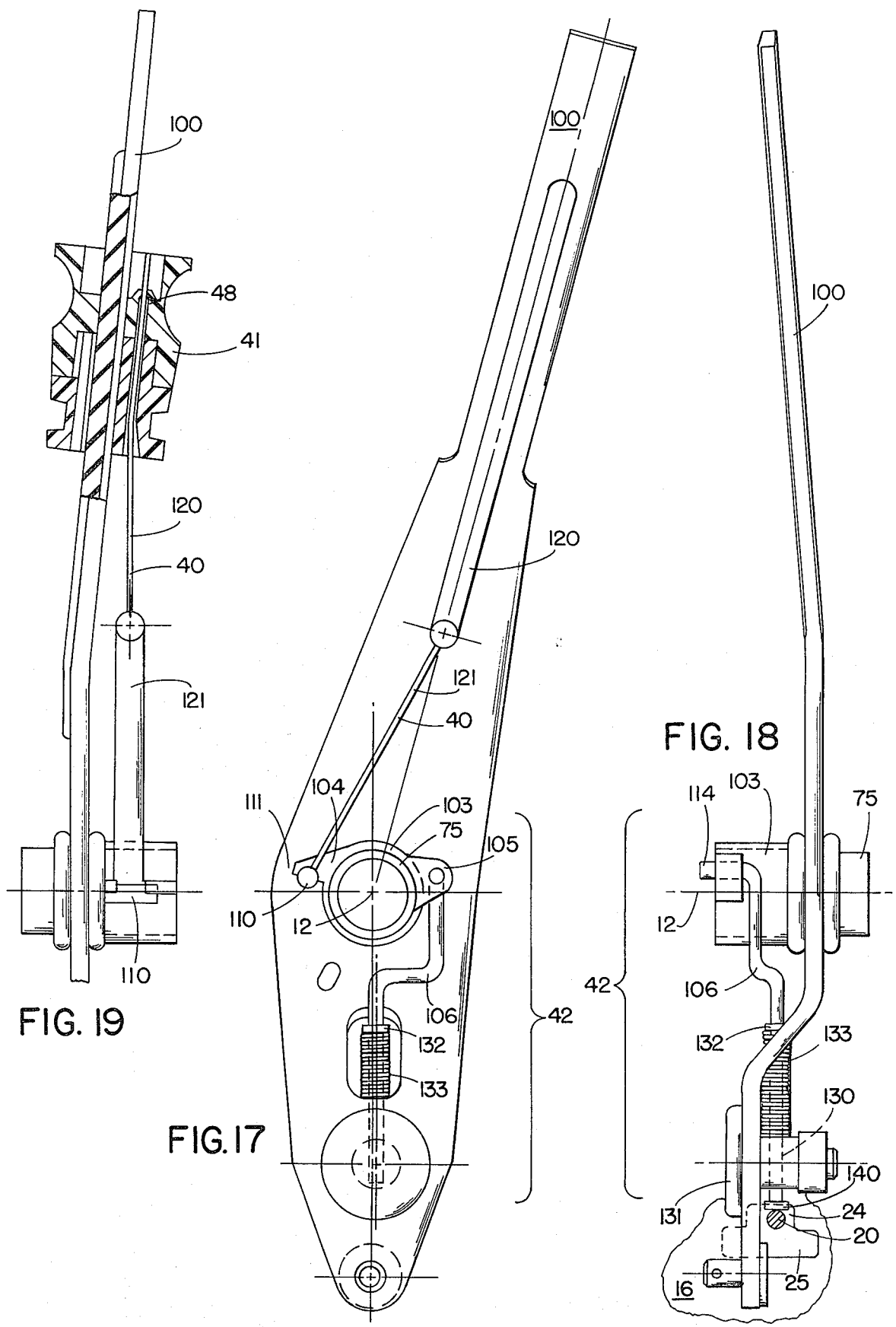

PULL-TYPE LOCKOUT ACTUATOR FOR TRANSMISSION SHIFTERS

The present application is a continuation-in-part of U.S. Patent Application Ser. No. 905,123, filed Aug. 12, 1978, now U.S. Pat. No. 4,245,521, and entitled MANUAL TRANSMISSION SHIFTER FOR OPERATING A TRANSMISSION WITH FLEXIBLE CABLES and U.S. Patent Application Ser. No. 115,126, filed Jan. 24, 1980 and entitled LOCKOUT FOR GIMBAL-TYPE AUTOMOTIVE TRANSMISSION GEAR SHIFTERS.

BACKGROUND OF THE INVENTION

The invention relates generally to lockouts for automotive transmission shifters and more particularly, to an improved pull-type lockout actuator.

The disclosures of the aforementioned patent applications are hereby incorporated by reference. Gimbal-type automotive manual transmission shifters are known and the aforementioned parent applications relate to a gimbal-type manual automotive transmission shifter for shifting an automotive transmission with a pair of flexible shielded cables and an improved gear lockout for the same, respectively. The present invention relates to a pull-type gear lockout actuator that while particularly adapted for use with the shifters disclosed in the aforementioned applications is not limited thereto in its utility.

Various types of lockout mechanisms have been provided with automotive transmission shifters. In one type of reverse gear lockout the gear selecting shift lever must be simultaneously lifted and aligned with a gate before the shift lever can be pivoted into engagement with a reverse gear actuator. In another type of reverse gear lockout, biasing means is provided to normally bias the gear selecting shift lever away from the reverse gear actuating position. Thus, to shift into reverse with this type of lockout a force substantially greater than the normal gear shifting force is required to overcome the lockout bias.

Still other types of reverse gear lockout mechanisms used with automotive transmissions employ a so-called positive lock comprising a mechanical stop or the like which may be removed only by some action independent from the normal shifting action of the gear selecting shift lever. For example, with such a lockout, reverse gear may only be entered by actuating a separate reverse gear lockout lever that is independent from the principal gear selecting shift lever. Of these prior art positive lock lockout mechanisms, those employing a pushbutton release or pull ring release disposed on the handle of the gear selecting shift lever are most desirable. The advantages of this type of lockout mechanism center about operator convenience and aesthetic appeal.

In prior art pushbutton or pull ring actuated positive lock-type lockouts generally a rigid push or pull rod is used to interconnect the pull ring or pushbutton disposed atop the shift lever and a displaceable detent means disposed in the body of the transmission shifter. The principal problem with prior art lockout actuators of this type stems from the fact that a separate push or pull rod must be designed for each shift lever having a different length or angular orientation with regard to the body of the shifter. Of course, this adds to the cost of the shifter. Furthermore, these push and pull rods must be manufactured to certain dimensional tolerances and failure to meet these tolerances results in the additional cost of hand fitting the rod or accepting the cost of discarding a certain percentage of the rods.

Flexible push or pull rods are found in the prior art for interconnecting shift lever mounted pushbuttons or pull rings and a lockout actuator or gear detent means disposed in the body of the shifter. Typically, these flexible rods function much like a flexible shielded cable known in the art as a Bowden cable and in one prior art pushbutton detent actuator, a flexible polymeric push rod is used that extends through a tubular shift lever handle. The structurally rigid tubular shift lever handle provides the necessary support for the polymeric push rod in effect forming a Bowden cable. While these arrangements accommodate shift levers having various bends or angular orientations with respect to the body of the shift lever, these devices do not readily accommodate shift levers having different lengths.

SUMMARY OF THE INVENTION

According to the present invention, these and other problems in the prior art are solved by provision of a pull-type actuator for a positive lock-type transmission shifter lockout comprising in combination a stationary base adapted to be mounted in an automotive vehicle, one or more gates disposed in the base, a pivotable upstanding shift lever extending from the base and detent means mounted for reciprocal movement adjacent the lower end of the shift lever. The detent means is alignable in one or more of the gates disposed in the base to allow entry into the locked out gear positions. A manually actuable pull is disposed on the upper end of the shift lever and a flexible actuator link extends from detent means to the pull. Detent engaging means for engaging the detent is disposed on the lower end of the link. A rack of teeth is disposed on the upper end of the actuator link and the pull is provided with tooth engaging means for engaging the teeth on the actuator link in a one-way ratchet-like fashion to thereby tension the link between the detent engaging means and the pull. The actuator link may be molded from a suitable polymeric material such as Nylon and the flexible actuator thus accommodates shift levers having various shapes or angular orientations with respect to the body of the shifter. Furthermore, the actuator link may be provided with a rack of teeth of sufficient length to accommodate a wide range of shifter lengths. Once the rack of teeth is threaded through the tooth engaging means disposed on the pull, and the actuator link is tensioned between the detent engaging means and the pull, the excess length of the actuator link extending above the pull may simply be severed.

BRIEF DESCRIPTION OF THE DRAWINGS

FIG. 1 is an elevational side view, partially in section, of a pull-type lockout actuator constructed according to the present invention.

FIG. 2 is a rear elevational view partially in section, of the lockout actuator of FIG. 1.

FIG. 3 is a shift pattern for the shifter and lockout actuator illustrated in FIG. 1.

FIG. 4 illustrates a slot configuration for forming reverse and fifth gear lockout gates in the base of the shifter and lockout actuator illustrated in FIGS. 1 and 2. The positions of the detent shaft for the various gear positions are illustrated in phantom.

FIG. 5 is a rear elevational view of the lower portion of the actuator link of the pull-type lockout actuator of the present invention.

FIG. 6 is a side elevational view of the actuator link illustrated in FIG. 5.

FIG. 7 is a sectional view of the actuator link illustrated in FIG. 6 taken along line VII—VII of FIG. 6.

FIG. 8 is a partial sectional view of the top portion of the actuator link of the present invention taken along line VIII—VIII in FIG. 10.

FIG. 9 is a side elevational view of the top portion of the actuator link of the present invention.

FIG. 10 is a rear elevational view of the top portion of the actuator link of the present invention.

FIG. 11 is a cross-sectional view of the actuator link of the present invention taken along line XI—XI in FIG. 10.

FIG. 12 is a detailed view of the uppermost portion of the actuator link of the present invention.

FIG. 17 is another embodiment of the pull-type lockout actuator of the present invention. In this case, the actuator is applied to a shift lever having a stamped rather than a tubular shift lever handle.

FIG. 18 is a rear elevational view of the pull-type lockout actuator of FIG. 17.

FIG. 19 is a front elevational view of the upper portion of the pull-type lockout actuator illustrated in FIGS. 17 and 18.

FIG. 20 is a rear elevational view of another embodiment of the pull-type lockout actuator of the present invention.

DESCRIPTION OF THE PREFERRED EMBODIMENTS

Figure 16:
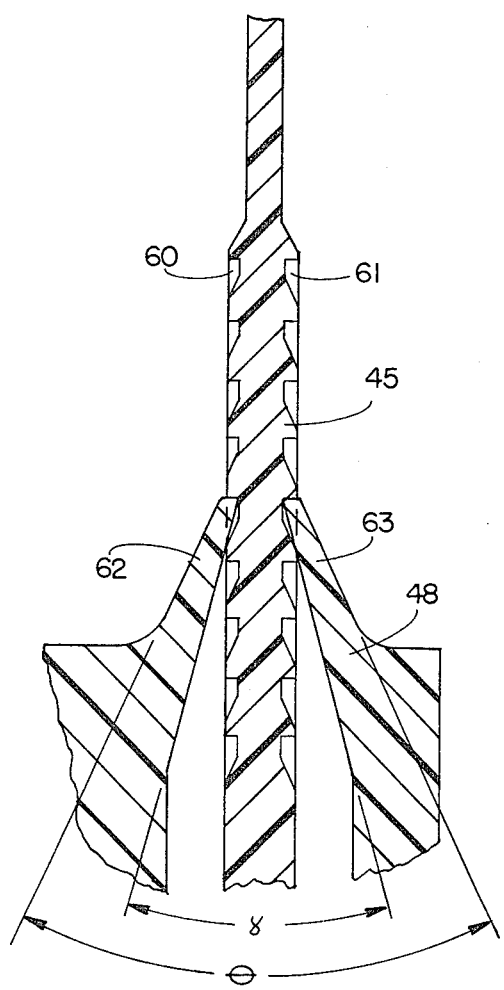
FIG. 16 is an enlarged sectional view of the interengagement of a rack of teeth and the tooth engaging means of the present invention.

Referring to FIGS. 1 and 2, a pull-type actuator for a transmission shifter lockout is illustrated. In this case, the shifter illustrated at 10 is a gimbal-type of shifter for operating a manual transmission with first and second flexible shielded cables known in the art as Bowden cables. The upstanding shift lever 11 is pivotable about a first axis 12 disposed on a shift lever carrier 13. The shift lever carrier 13 is pivotable about a second axis 15 disposed on a stationary base 16 that is adapted to be mounted to an automotive vehicle. The first and second axes 12 and 15 are mutually orthogonal. A first Bowden cable is connected directly to the lower end of the shift lever 11 by a pin 18. A second Bowden cable is connected to the carrier 13 by a bell crank and suitable linkage not illustrated herein. Pivotal motions of the shift lever 11 about the first and second axes 12 and 15 are transmitted to the remotely located transmission by first and second Bowden cables to affect transmission gear changes. A typical transmission shift pattern for a five gear manual automotive transmission shifter with reverse is illustrated in FIG. 3. The shift lever 11 is moved along the vertical lines in FIG. 3, such as between the first and second gear positions, by pivotal motion of the shift lever 11 about the first axis 12. The shift lever is moved along the horizontal lines in FIG. 3, such as between the $N_{1,2}$ and the $N_{3,4}$ positions, by pivotal movement of the shift lever 11 and carrier 13 about the second axis 15. In the normal operation of the shifter, positive mechanical stops are encountered when the operator attempts to shift into either the reverse or fifth gear positions such as, for example, when the operator attempts to shift from the $N_{1,2}$ position to the $N_R$ position or from the $N_{3,4}$ position to the $N_5$ position in an attempt to enter either reverse or fifth gears, respectively. The present invention more particularly relates to an actuator for removing this positive mechanical stop.

In this case, the positive mechanical stop is provided by a detent shaft 20 reciprocally mounted adjacent the lower end of the shift lever 11 and extending through the shift lever carrier 13 and the base 16. Opposing ends 21 and 22 of the detent shaft 20 extend through slots in the base 16. With reference also to FIG. 4, opposing sides of the base 16 are provided with first and second slots 24 and 25. The upper slot 25 is considerably longer than the lower slot 24 and the detent shaft 20 is normally spring biased downwardly into the first slot 24 by leaf springs 27 and 28. As the shift lever 11 and carrier 13 are pivoted about the second axis 15, the $N_{1,2}$ and $N_{3,4}$ positions are defined by interference between the detent shaft 20 and the ends 30 and 31 of the first slot 24. The second slot 25 provides first and second gates disposed in the base to allow entry of the shift lever to either the $N_R$ or $N_5$ positions. Entry into these positions is effected by upward displacement of the detent shaft 20 which provides for further rotation of the shift lever 11 and carrier 13 about the second axis 15 in either the direction of the $N_R$ or $N_5$ positions by virtue of the fact that the second slot 25 is somewhat longer or larger than the first slot 24. Eventually interference between the detent shaft 20 and the ends 34 and 35 of the second slot 25 define the $N_R$ and $N_5$ positions, respectively. Thereafter, the shift lever 11 is pivoted about the second axis 13 to fully engage either the reverse or fifth gear positions.

A flexible lockout actuator link 40 extends from a manually actuated pull 41 disposed on the top of the shift lever 11 and the detent means 20 reciprocally mounted adjacent the lower end of the shift lever 11. The actuator link is preferably formed from a flexible polymeric material such as molded Nylon and is illustrated in further detail in FIGS. 5–12. The actuator link 40 includes detent engaging means 42 disposed on the lower end of the link. A plurality of teeth or a rack of teeth 45 is disposed on the upper end 46 of the actuator link 40. The pull 41 is provided with tooth engaging means 48 for engaging the teeth 45 on the actuator link 40 in a one-way ratchet-like fashion. The flexible actuator link 40 is thus tensioned between the detent engaging means 42 and the pull 41 by the ratchet-link interaction of the teeth 45 and the tooth engaging means 48 disposed on the pull 41. Because of the flexible nature of the actuator link 40, shift levers 11 having various shapes or angular orientations with respect to the base 16 of the shift lever may be easily accommodated with the same actuator link 40. Furthermore, shift levers having various lengths are accommodated by the ratchet-like interaction between the pull 41 and the actuator link 40. More specifically, once the shifter 10 is assembled with the flexible actuator link 40 threaded upwardly the length of the tubular shift lever 11, the upper portion 46 of the actuator link 40 will extend from the top of the shift lever 11. The pull 41 is then dropped over the top of the shift lever 11, the tooth engaging means 48 of the pull 41 extending into the interior of the tubular shift lever 11 through slot 50, best illustrated in FIG. 2. When the pull 41 is dropped over the top of the shift lever 11, the upper portion 46 of the flexible actuator link 40 is simultaneously threaded or drawn through the tooth engaging means 48. As best illustrated in FIGS. 9 and 12, the upper end 46 of the flexible actuator link 40 is tapered to a point 51 that facilitates insertion of the flexible actuator link into the tooth engaging means 48. Once the rack of teeth 45 is engaged by the tooth engaging means 48, the flexible actuator link 40 is tensioned by the ratchet-like engagement of the rack 45 and the tooth engaging means 48, snugly tensioning the flexible actuator link 40 between the detent engaging means 42 and the pull 41 thus accommodating shift levers of variable lengths. Any portion of the flexible actuator link 40 extending above the pull 41 may be severed thereafter. Once the pull 41 is connected to the actuator link 40, a shift lever handle, illustrated in phantom at 52, is mounted atop the shift lever 11. The shift lever handle 52 may be appropriately positioned on the shift lever handle 11 such that when the lockout pull 41 is manually actuated by the operator, the lockout pull 41 bottoms against the lower end of the shift lever handle 52, preventing over tensioning of the flexible lockout actuator link 40.

Figure 15:
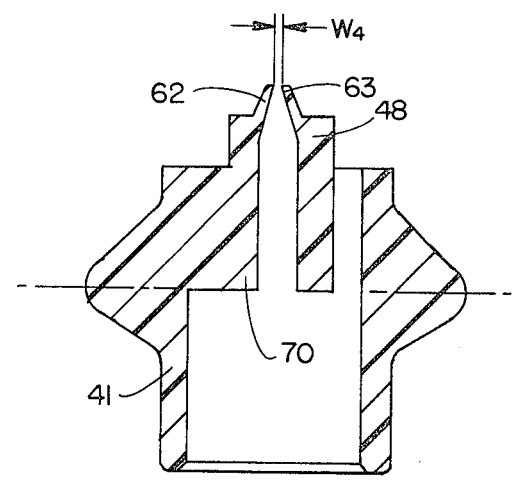
FIG. 15 is a sectional view of the pull ring of the present invention taken along line XV—XV in FIG. 13.
Figure 13:
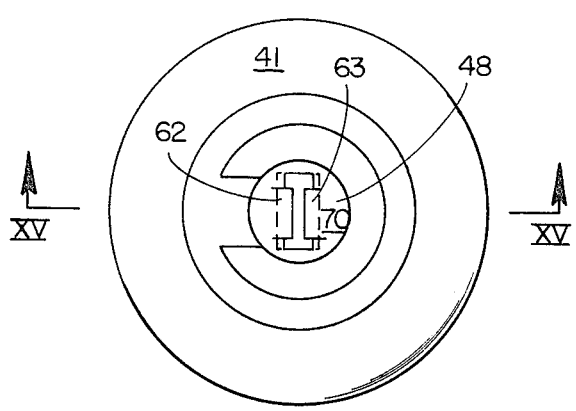
FIG. 13 is a top view of the pull ring of the present invention.
Figure 14:
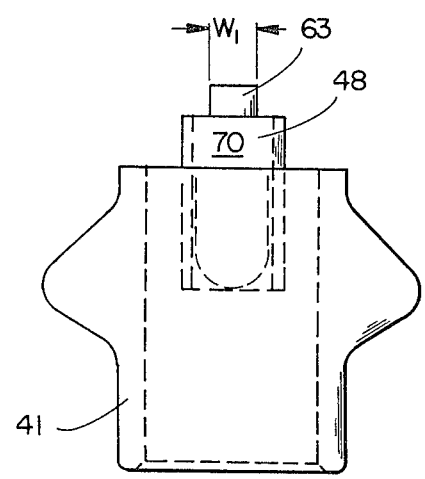
FIG. 14 is a side elevational view of the pull ring of the present invention.

As previously noted, in this case, shift lever 11 is a tubular member and the flexible lockout actuator 40 extends therethrough. In this case, the flexible lockout actuator link 40 may be provided with one or more spherical guides 55 for slidably engaging the interior of the tubular shift lever 11 and thus reducing friction between the actuator link 40 and the shift lever 11. The spheres 55 may be molded in situ on the flexible actuator link 40. The flexible actuator link 40 is preferably a flat strip of Nylon and with particular reference now to FIG. 8, the top portion 46 of the flexible actuator link 40 preferably includes first and second oppositely opposing linear arrays or racks of teeth 60 and 61, respectively. The first and second racks of teeth 60 and 61 are disposed on opposing sides of the flat strip-like body of the actuator link 40. With reference now to FIGS. 15 and 16, it is illustrated that the tooth engaging means 48 preferably comprises first and second resilient pawl arms 62 and 63 for engaging the first and second racks 60 and 61 of the actuator link 40, respectively. The pull 41 and the resilient pawl arms 62 and 63 are preferably molded from a polymeric material such as Nylon. The racks of teeth 60 and 61 do not extend completely across opposing faces of the actuator link 40 but are bordered by shoulders 65 and 66 disposed on opposing sides of the racks 60 and 61 and best illustrated in FIGS. 10 and 11. The resilient pawl arms 62 and 63 are provided with a width $W_1$, best illustrated in FIG. 14, that is equal to or slightly less than the width $W_2$ of the first and second racks 60 and 61, best illustrated in FIG. 10. The pawls 62 and 63 thus ride between the shoulders 66 and 65 in a track-like fashion. For illustrative purposes, the angles $\alpha$ and $\beta$ of the teeth from which the first and second racks 60 and 61 are composed may be approximately five and twenty degrees, respectively, and the angles $\gamma$ and $\theta$ in FIG. 16 defining the configuration of the first and second pawls 62 and 63 may be approximately thirty and fifty degrees, respectively. The minimum diameter $W_3$ of the first and second racks 60 and 61, best illustrated in FIG. 8 should be approximately equal to the width $W_4$ of the gap disposed between the first and second resilient pawls 62 and 63.

When the pull 41 is dropped over the end of the shift lever 11 during the assembly of the lockout actuator of the present invention, the tapered end 51 of the lockout actuator, best illustrated in FIG. 12, facilitates insertion of the top portion of the actuator between the first and second resilient pawls 62 and 63. As the top of the actuator link 40 is drawn upwardly between the resilient pawls 62 and 63, little or no resistance is met until the first set of opposing teeth of the first and second racks 60 and 61 is met by the pawls 62 and 63. Thereafter, a moderate amount of upward force is sufficient to cam the resilient pawl arms 62 and 63 over successive sets of teeth until the tooth engaging means 48 of the pull ring 41 bottoms in the slot 50 of the shift lever 11 and snugly tensions the flexible actuator link 40 between the pull 41 and the detent actuating means 42. The one-way ratchet-like engagement of the pawl arms 62 and 63 and the tooth rack 60 and 61 prevent the actuator link 40 from moving downwardly relative to the pull 41. Thus, when the pull 41 is manually actuated upward relative to the shift lever handle 11, the actuator link 40 is drawn upward. If the operator applies sufficient upward force on the pull ring 41 to overcome the spring biasing force of the leaf springs 27 and 28, the detent shaft 20 is drawn upward into a gate provided by the second slot 25 in base 16 allowing the operator to selectively enter either the reverse or fifth gear positions.

In the case where the pull ring 41 surrounds a tubular shift lever handle 11, preferably the tooth engaging means 48 is incorporated in a cylindrical plug 70 that is slightly smaller in diameter than the inside diameter of the tubular shift lever handle 11. Plug 70 slideably engages the sides of the shift lever handle 11 to guide the reciprocal pull 41 and actuator link 40.

With particular reference now to FIGS. 1 and 2, it is illustrated that the detent engaging means 42 of the actuator link 40 preferably includes a first guide means 71 best illustrated in FIGS. 5 and 6. The first guide means 71 comprises first and second generally vertically oriented and opposing faces 72 and 73 which slideably engage opposing sides of a pivot shaft 75 centered on the first axis 12. The actuator link 40 is widened in the area of the first guide means 71 to provide wide bearing surfaces between the pivot shaft 75 and the first guide means 71 and effectively stabilize the link 40 there-around.

Preferably, the shift lever 11 comprises a tubular upper portion 78 and a stamped metal lower portion 79. The tubular upper portion 78 of the shift lever 11 is suitably secured to the stamped metal portion 79 by welding or the like. Preferably, the stamped metal lower portion 79 comprises first and second opposing stampings 80 and 81. The first and second stampings 80 and 81 define generally parallel first and second opposing walls 82 and 83. A second guide means is formed on the bottom of the flexible actuator link 40. The second guide means comprises a pair of tracks or channels 85 and 86 formed on opposing sides of the actuator link 40. The first and second walls 82 and 83 of the stampings 80 and 81 are provided with lanced inwardly projecting tabs 90 and 91, respectively. The lanced tabs 90 and 91 project into the tracks or channels 85 and 86, respectively to guide the reciprocal actuator link 40. Furthermore, the width $W_5$ of the lower portion of the actuator link 40 is approximately equal to the distance between the first and second walls 85 and 86 of the stampings 80 and 81 to further stabilize the lower end of the actuator link 40. The detent engaging means 42 disposed on the lower end of the actuator link 40 further comprises a slot 95 through which the detent shaft 20 projects. The lower end of the actuator link 40 thus encompasses the detent shaft 20 to insure that the detent shaft 20 reciprocates therewith.

With reference now to FIGS. 17, 18 and 19, an embodiment of the pull-type actuator of the present invention adapted for use with a stamped shift lever 100 is illustrated. In many applications, the stamped shift lever 100 is preferred simply as a cost reducing expediency. Again, a pull 41 including tooth engaging means 48 is reciprocally mounted on the top portion of the shift lever 100. In this case the pull 41 comprises two parts, 41a and 41b that are secured together in some suitable fashion such as by an interference fit. More importantly, in this case, the detent engaging means 42 comprises a pivotal motion reversing lever 103 journaled on the pivot shaft 75 centered on the first axis 12. The lever 103 includes first and second lever arms, or ends 104 and 105. The flexible actuator link 40 engages the first arm 104 of the lever 103 and a rigid push rod 106 engages the second arm 105 of the lever 103. Both the flexible actuator link 40 and the push rod 106 pivotally engage the first and second arms 104 and 105 of the lever 103. In the case of the actuator link 40 this is accomplished by providing the lower end of the actuator link 40 with a cylindrical tie 110 that is journaled in a cylindrical socket formed in the bifurcated end 111 of the first arm 104. Pivotal motion between the second arm 105 and the rigid push rod 106 is accommodated by providing the end 114 of the push rod 106 with a 90° bend and then journaling the same in an aperture disposed in the second arm 105.

The actuator link 40 is comprised of first and second angularly intersecting linear segments 120 and 121 to accommodate the relative positions of the pull 41 and the first arm 104. The body of the actuator link 40 is again preferably formed from a molded Nylon part having a generally strip or flat shape cross section. The central axis of the highest moments of inertia of each of the linear segments 120 and 121 of the flexible actuator link 40 are disposed approximately orthogonal to one another and the linear segments 120 and 121 are molded together at 122.

The lower end 130 of the push rod 106 slidably engages a bore disposed in weld pin 131. The weld pin 131 thus serves as a guide for the push rod 106 which reciprocates along with the actuator link 40 when the operator manually actuates the pull ring 41. The push rod 106 further includes a shoulder 132 and a coil spring 133 compression mounted between the shoulder 132 and the weld pin 131. Thus, the push rod 106 is spring biased upwardly by the spring 103. The lower end 130 of the push rod 106 includes a foot 140 which abuts the detent shaft 20. In this case, the leaf springs associated with the detent shaft 20 spring bias the detent shaft 20 in an upward rather than a downward direction. The first and second slots 24 and 25 disposed in the base 16 are reversed from the orientation illustrated in FIG. 4, the smaller first slot 24 being disposed above rather than below the second slot 25. Thus, when the pull ring 41 is manually actuated upward by the operator, the reciprocating actuator link 40 pivots the lever 103 displacing the push rod 106 downward overcoming the spring biasing force of coil spring 133 to displace the detent shaft 20 downwardly from the first slot 24 into the second slot 25. The larger second slot 25 provides the additional clearance necessary to pivot shift lever 100 and the carrier 13 about the second axis 15 an amount sufficient to allow the operator to selectively enter the reverse or fifth gear positions. In all other regards the operation of the shifter illustrated in FIGS. 17–19 is the same as that previously illustrated.

FIG. 20 illustrates an embodiment of the invention wherein a pivotal detent pawl 154 is employed rather than the reciprocating detent shaft 20. The pawl 154 is journaled in the carrier 13 about pin 155. The lower end 130 of the push rod 106 abuts a platform 156 formed on one end of the pawl 154. The opposite end 160 of the pawl 154 normally engages a portion 161 of the base 16 limiting rotation of the shift lever 100 and carrier 13 about the second axis 15 and thus normally preventing entry into the reverse gear position. To insure interference between the end 160 of the pawl 154 and the portion 161 of the base 16 the end 160 of the pawl 154 is spring biased downwardly by tension mounted coil spring 163. The base 16 also includes a gate or window 166 to facilitate entry into the locked out gear position when the pivotal pawl 154 is actuated. More specifically, when the pull ring disposed atop the shift lever 100 is manually actuated the lower end 130 of the push rod 106 is displaced downwardly engaging the platform 156 of the pawl 154. This pivots the pawl 154 in the counterclockwise direction, when sufficient force is applied to overcome the tension spring 163, displacing the end 160 of the pawl 154 upwardly into alignment with the gate 166 disposed in the base 16. With the pawl 154 aligned with the gate 166 the operator is provided with the additional clearance necessary to pivot the shift lever into the locked out gear. Normally this type of lockout is used to provide a reverse gear lockout in a four or five forward gear shifter having an H-type shift pattern like that illustrated in FIG. 3.

The above description should be considered as exemplary and that of the preferred embodiment only. The true spirit and scope of the present invention should be determined by reference to the appended claims. It is desired to include within the appended claims all modifications of the invention that come within the proper scope of the invention.

The embodiments of the invention in which an exclusive property or privilege is claimed are defined as follows.

1. A pull-type actuator for a transmission shifter lockout comprising:
   a stationary base adapted to be mounted to an automotive vehicle;
   a gate disposed in said base;
   a pivotable upstanding shift lever extending from said base;
   detent means mounted for reciprocal movement adjacent the lower end of said shift lever said detent means being alignable in said gate to allow entry into a locked out gear;
   a manually actuable pull disposed on the upper end of said shift lever;
   a flexible actuator link extending from said detent means to said pull;
   detent engaging means for engaging said detent disposed adjacent the lower end of said actuator link;
   a plurality of teeth disposed on the upper end of said actuator link; and
   tooth engaging means disposed on said pull for engaging said teeth on said actuator link in a one way ratchet-like fashion and thereby tensioning the same between said detent engaging means and said pull.

2. The pull-type actuator of claim 1 wherein said plurality of teeth comprise first and second racks of oppositely facing teeth disposed on opposing sides of said actuator link and said tooth engaging means comprises first and second resilient pawl arms for engaging said first and second racks, respectively, in a ratchet-like fashion.

3. The pull-type actuator of claim 2 wherein both of said pawl arms are cantilevered from a common base member and both of said pawl arms extend upwardly and toward each other.

4. The pull-type actuator of claim 3 wherein each tooth disposed in said racks of teeth is provided with an upwardly facing surface forming an acute angle with respect to the vertical for camming said pawl arms over each of said teeth when said pull is urged downward with respect to said actuator link.

5. The pull-type actuator of claim 4 wherein each tooth disposed in said racks of teeth is provided with a downwardly facing surface forming an acute angle with respect to the horizontal for retaining said pawl arms thereunder in a ratchet-like fashion.

6. The pull-type actuator of claim 5 wherein each of said pawl arms is provided with a tooth engaging portion and each of said racks of teeth is provided with first and second shoulders bounding the sides of said racks of teeth, said first and second shoulders being separated by a distance slightly greater than the width of said tooth engaging portion of said pawl arms such that said pawl arms are restrained therebetween in a track-like fashion.

7. The pull-type actuator of claim 1 wherein said shift lever is tubular and said actuator link extends therethrough.

8. The pull-type actuator of claim 7 wherein said pull comprises a pull ring encompassing and slidably engaging said tubular shift lever, said pull ring including a generally cylindrical plug slidably engaging the interior of said shift lever, said plug including said tooth engaging means.

9. The pull-type actuator of claim 7 wherein said actuator link comprises a flat strip of molded Nylon including at least one spherical guide formed therein, said at least one spherical guide slidably engaging the interior of said tubular shift lever.

10. The pull-type actuator of claim 7 wherein said shift lever is pivotable about first and second generally orthogonal axes and said detent engaging means includes first guide means for said actuator link encompassing a pivot shaft disposed on one of said first and second axes.

11. The pull-type actuator of claim 10 wherein said first guide means comprises first and second generally vertically oriented and opposing faces slidably engaging opposite sides of said pivot shaft.

12. The pull-type actuator of claim 10 wherein said shift lever comprises a tubular upper portion and a stamped metal lower portion secured thereto, said stamped metal lower portion including first and second opposing walls, said first and second opposing walls including first and second inwardly projecting lanced tabs; and said detent engaging means further includes a second guide means comprising a pair of oppositely facing tracks disposed on the lower end of said actuator link, said first and second inwardly projecting lanced tabs slidably engaging said pair of tracks.

13. The pull-type actuator of claim 1 wherein said shift lever is a stamped metal part.

14. The pull-type actuator of claim 13 wherein said pull comprises a pull ring encompassing and slidably engaging said shift lever.

15. The pull-type actuator of claim 13 wherein said shift lever is pivotable about first and second generally orthogonal axes and said detent engaging means comprises a pivotable motion reversing lever journaled on a pivot shaft disposed on one of said first and second axes, said lever including first and second arms, said actuator link engaging said first arm of said lever and a push rod engaging said second arm of said lever.

16. The pull-type actuator of claim 15 wherein said push rod is spring biased upwardly, the upper end of said push rod engaging said second end of said lever and the lower end of said push rod abutting said detent means.

17. The pull-type actuator of claim 15 wherein said actuator link is comprised of a plurality of angularly intersecting linear segments the central axes of the highest moment of inertia of each linear segment being approximately orthogonal.

* * * * *